No. 848,068. PATENTED MAR. 26, 1907.
J. B. THACHER.
SIDEWALK CONDUIT.
APPLICATION FILED OCT. 6, 1904.

Witnesses: Inventor
John Boyd Thacher
By W. M. Brown
his Atty

UNITED STATES PATENT OFFICE.

JOHN BOYD THACHER, OF ALBANY, NEW YORK.

SIDEWALK-CONDUIT.

No. 848,068.      Specification of Letters Patent.      Patented March 26, 1907.

Application filed October 6, 1904. Serial No. 227,447.

*To all whom it may concern:*

Be it known that I, JOHN BOYD THACHER, a citizen of the United States, residing at Albany, New York, have invented certain new and useful Improvements in Sidewalk-Conduits; and I do hereby declare the following to be a full, clear, and exact description of the invention, such as will enable others skilled in the art to which it appertains to make and use the same, reference being had to the accompanying drawings, and to the letters and figures marked thereon, which form a part of this specification.

My invention relates to a conduit or conduits for use in city or town streets and other places where electric wires, gas and water pipes, and other devices are desired to be run or strung, and is so arranged so as to be easily, expeditiously, and cheaply put in place and afterward easily and cheaply reached for the purpose of renewal, repairs, or augmentation without digging the ground descending into subways or dragging wires through long closed pipes, but which may be accomplished directly from the surface by at once opening the conduit along more or less of its entire length, exposing its interior and its contents.

Figure 1:
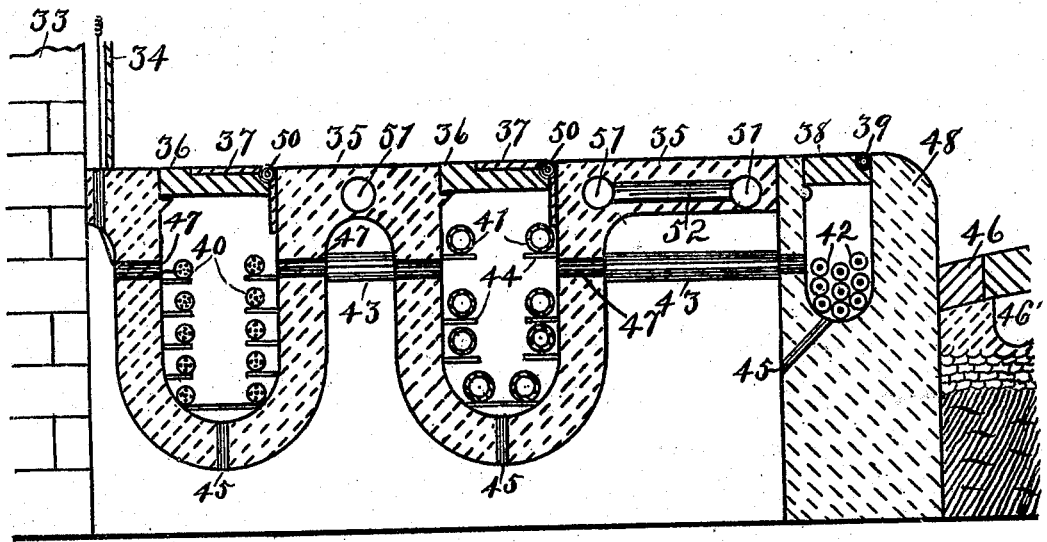
Figure 2:
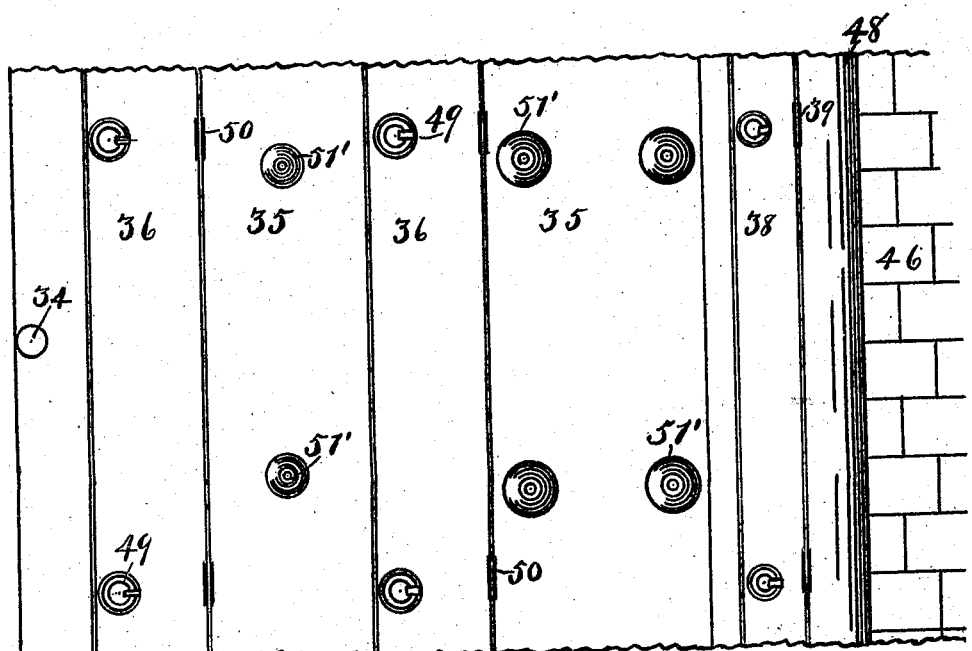

In the drawing, Figure 1 shows a cross-section of a street and a portion of the carriage-way, and Fig. 2 a plan view of Fig. 1 with my device shown in operative construction.

In the drawing, numeral 33 shows a house-front line and 34 a conduit passing up the front for the passage of an electric wire to any part of the house, thus avoiding unsightly poles and wires strung over and across the open street.

35 shows the sidewalk or foot-passage, which may be constructed of any material desired, but preferably of cement. This walk is in itself a conduit having openings in form of loops (any other configuration of the conduit may be used, if desired,) and conduits 51 and 52 therein.

36 shows surface-covers for the loops or conduits, which may be opened and closed by means of the hinges 37, or the covers may be simply dropped into place and lifted bodily when it is desired to open the conduits, or any form of rendering them movable may be used. At 40 will be seen telephone-cables laid therein on shelves or brackets 44, preferably, one of the wires being shown as passing from one of the cables 40 through an opening for the wire, as seen at 47, and through another opening in the walk and up tube 34 to any part of the house desired. The openings through the walls of the loops or conduits 47 are preferably in communication, where desired, by tubes 43, so that the wires from the conduits may be run in any desired direction without any trouble or digging. The smaller conduits 51 and their connection passage-ways 52 are also thus in communication for the running of any wires they may contain. The joint of the hinges 50 is so set and disposed as not to project from the surface of the walk. The smaller conduits shown 51 (they may be made in practice as large as desired in accordance with the thickness of the footway or walk) have covers opening them at intervals as seen at 51' in Fig. 2. My sidewalk-conduit butts against the curb 48, which also is a conduit openable and closable from the surface and lengthwise the conduit and is shown as containing electric cables 42, one form of cover being shown at 38 and the hinge at 39. 46 shows the road or carriage way also having a conduit 46', which is covered by one of the roadway-blocks, preferably, which is removable to uncover it when desired. I therefore provide a conduit which may be formed by or be a part of the sidewalk, curb, or carriage-way or any other object, and one that when put in place for use can be opened and its interior or contents be reached, not through the ends of the conduit, but through its walls and from the surface without disturbing the ground or the conduit itself.

At 45 is seen drainage-openings whereby any water or undue moisture is run off.

The sidewalk or footway may be of course constructed of any material desired—such as cement, asphalt, stone, iron or wood or other material to suit the convenience of users—as may also the carriage-way. The hinges 50 and 39 (shown in Fig. 2) in practice are so set as to leave the surface of the walk perfectly smooth and unobstructed, as are the rings 49, by which the doors or covers 36 are raised. My device, therefore, provides a conduit openable and closable along its entire length or at intervals, as may be desired, in which anything may be placed and taken therefrom, or repaired or otherwise attended to directly from the surface and without the expense of digging up the street or walk, my device showing one which forms practically a conduit or series of conduits, the conduits themselves forming practically the entire usable surface of a traveled subdivision of a street, the drawing showing one traveled subdivision as a sidewalk.

Having now described my invention so that those skilled in the art to which it appertains may know how to make and use the same, what I claim, and desire to secure by Letters Patent, is—

An integral sidewalk structure having depending longitudinal troughs formed in the material thereof and constituting conduits, cross-tubes connecting the interiors of said conduits, and covers for giving access to the tops thereof.

In testimony whereof I affix my signature in presence of two witnesses.

JOHN BOYD THACHER.

Witnesses:
 EDGAR KENNY,
 J. C. MacCULLOCH.